US008935519B2

(12) United States Patent
Hong et al.

(10) Patent No.: US 8,935,519 B2
(45) Date of Patent: Jan. 13, 2015

(54) APPARATUS AND METHOD FOR BOOTING IN COMPUTER DEVICE WITH BUILT-IN COMMUNICATION MODULE

(75) Inventors: Sung-Bin Hong, Seoul (KR); Seung-Hui Sunwoo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 750 days.

(21) Appl. No.: 13/005,298

(22) Filed: Jan. 12, 2011

(65) Prior Publication Data

US 2011/0179262 A1 Jul. 21, 2011

(30) Foreign Application Priority Data

Jan. 20, 2010 (KR) ........................ 10-2010-0005053

(51) Int. Cl.

| | |
|---|---|
| ***G06F 9/00*** | (2006.01) |
| ***G06F 15/177*** | (2006.01) |
| ***G06F 9/44*** | (2006.01) |
| ***H04B 1/00*** | (2006.01) |

(52) U.S. Cl.

CPC ................ *G06F 9/00* (2013.01); *G06F 9/4401* (2013.01); *H04B 1/00* (2013.01)

USPC .............................................................. 713/2

(58) Field of Classification Search

CPC ................................. G06F 9/00; G06F 9/4401

USPC .......................................................... 713/1, 2

See application file for complete search history.

(56) References Cited

U.S. PATENT DOCUMENTS

| | | | | |
|---|---|---|---|---|
| 6,381,477 | B1 * | 4/2002 | Johnson et al. | 455/572 |
| 7,690,570 | B2 * | 4/2010 | Fruhauf | 235/451 |
| 7,890,083 | B2 * | 2/2011 | Chandran | 455/411 |
| 2001/0016502 | A1 * | 8/2001 | Shirai | 455/558 |
| 2008/0161049 | A1 * | 7/2008 | Lagnado et al. | 455/558 |
| 2009/0013387 | A1 * | 1/2009 | Paas et al. | 726/5 |
| 2009/0088211 | A1 * | 4/2009 | Kim | 455/558 |
| 2009/0251854 | A1 * | 10/2009 | Leung | 361/679.09 |
| 2009/0305668 | A1 * | 12/2009 | Ahn et al. | 455/410 |
| 2010/0240351 | A1 * | 9/2010 | Kumar et al. | 455/419 |
| 2012/0282896 | A1 * | 11/2012 | Toh | 455/410 |

* cited by examiner

*Primary Examiner* — Mohammed Rehman

(57) ABSTRACT

An apparatus and method control booting in a mobile device with a built-in communication module to prevent a service user from using the mobile device for other purposes and to prevent the service user from subscribing to another service provider. A method includes determining, during a booting operation, whether the communication module is mounted with a USIM. A forced booting termination message is displayed if the communication module is not mounted with the USIM. And power supply is interrupted after a predetermined time from displaying the forced booting termination message.

20 Claims, 4 Drawing Sheets

APPARATUS AND METHOD FOR BOOTING IN COMPUTER DEVICE WITH BUILT-IN COMMUNICATION MODULE

CROSS-REFERENCE TO RELATED APPLICATION(S) AND CLAIM OF PRIORITY

The present application is related to and claims priority under 35 U.S.C. §119 to an application filed in the Korean Intellectual Property Office on Jan. 20, 2010 and assigned Serial No. 10-2010-0005053, the contents of which are incorporated herein by reference.

TECHNICAL FIELD OF THE INVENTION

The present invention relates generally to computer devices and, in particular, to an apparatus and method for booting up an e-book or a mini notebook computer with a built-in HSPA (High Speed Packet Access) module.

BACKGROUND OF THE INVENTION

With the advent of ubiquitous environments, integration or division are performed between various mobile devices. In line with this trend, various communication technologies are applied to a mobile device (e.g., a netbook computer or a mini notebook computer for storing simple data or sharing contents in a local region) such that the mobile device can access a network to process high-speed data. For example, a communication module such as WiBro and HSPA (High Speed Packet Access) is mounted in the mobile device to process high-speed data.

A mini notebook computer is designed in such a way that it is mounted with an HSPA module and a USIM (Universal Subscriber Identity Module) card. The USIM card stores personal information in order to provide a service user with various services such as user authentication, charging, and security. If the USIM card is not mounted in the mini notebook computer, the service user may not use the Internet through the HSPA module.

Meanwhile, for popularization of WiBro and HSPA services, communication service providers provide service subscribers with netbook computers or mini notebook computers, mounted with an HSPA module, without charge or at a low price. Thus, when subscribing to an HSPA service of a communication service provider, a service user can obtain a mini notebook computer, mounted with an HSPA module, at a low price.

The service user who has the mini notebook computer with the HSPA module provided by the communication service provider can change to an HSPA service of other communication service provider by mounting an USIM card of the other communication service provider in the mini notebook computer. Also, booting is possible even when the mini notebook computer is not mounted with a USIM or a HSPA module, and a wired/wireless Internet based on a wired/wireless LAN (WiFi) can be used even without using a high-speed data service based on an HSPA module.

As such, the service user may use the mini notebook computer even without using an HSPA module. In this situation, because the mini notebook computer, which is provided to the service user for popularization of an HSPA service, is used for other purposes, the communication service provider meets with a loss on sales.

What is therefore needed is a scheme for preventing a service user, which has a mini notebook computer or a netbook computer provided by a communication service provider, from using the mini notebook computer or the net book computer for other purposes, and preventing the service user from changing an HSPA service to other communication service providers.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an object of the present invention is to provide an apparatus and method for booting in a mobile device with a built-in communication module.

Another object of the present invention is to provide an apparatus and method for restricting the use of a mobile device with a built-in communication module on the basis of a restricted booting mode.

According to an aspect of the present invention, a method for controlling booting in a mobile device with a built-in communication module includes determining, in a booting operation, whether the communication module is mounted with a universal subscriber identity module (USIM). A forced booting termination message is displayed if the communication module is not mounted with the USIM. And power supply is interrupted after a predetermined time from displaying the forced booting termination message.

According to another aspect of the present invention, a method for controlling booting in a mobile device includes determining, in a booting operation, whether the mobile device is mounted with a communication module and a universal subscriber identity module (USIM). A forced booting termination message is displayed if the mobile device is not mounted with the communication module and the USIM. And power supply is interrupted after a predetermined time from displaying the forced booting termination message.

According to another aspect of the present invention, an apparatus for controlling booting in a mobile device with a built-in communication module includes a processor for determining, in a booting operation, whether the communication module is mounted with a universal subscriber identity module (USIM). The processor displays a forced booting termination message if the communication module is not mounted with the USIM and interrupts a power supply after a predetermined time from displaying the forced booting termination message.

According to yet another aspect of the present invention, an apparatus for controlling booting in a mobile device includes a processor for determining, in a booting operation, whether the mobile device is mounted with a communication module and a universal subscriber identity module (USIM). The processor displays a forced booting termination message if the mobile device is not mounted with the communication module and the USIM and interrupts a power supply after a predetermined time from displaying the forced booting termination message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects, features and advantages of certain embodiments of the present invention will be more apparent from the following detailed description when taken in conjunction with the accompanying drawings in which.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Embodiments of the present invention will be described with reference to the accompanying drawings. In the following description, well-known functions or constructions are not described in detail as they would obscure the invention in unnecessary detail. Terminologies described below are defined with consideration of functions in the present invention and may change based upon preferences or practice of a user or operator. Therefore, the definitions should be determined on the basis of the descriptions in the specification.

The present invention provides an apparatus and method for booting a computer device with a built-in communication module. In particular, the present invention provides an apparatus and method for preventing a service user from using a mini notebook computer or an e-book, which is mounted with a high speed packet access (HSPA) module provided to the service user by a communication service provider, for other purposes and preventing the service user from changing a service to other communication service providers.

Figure 1:
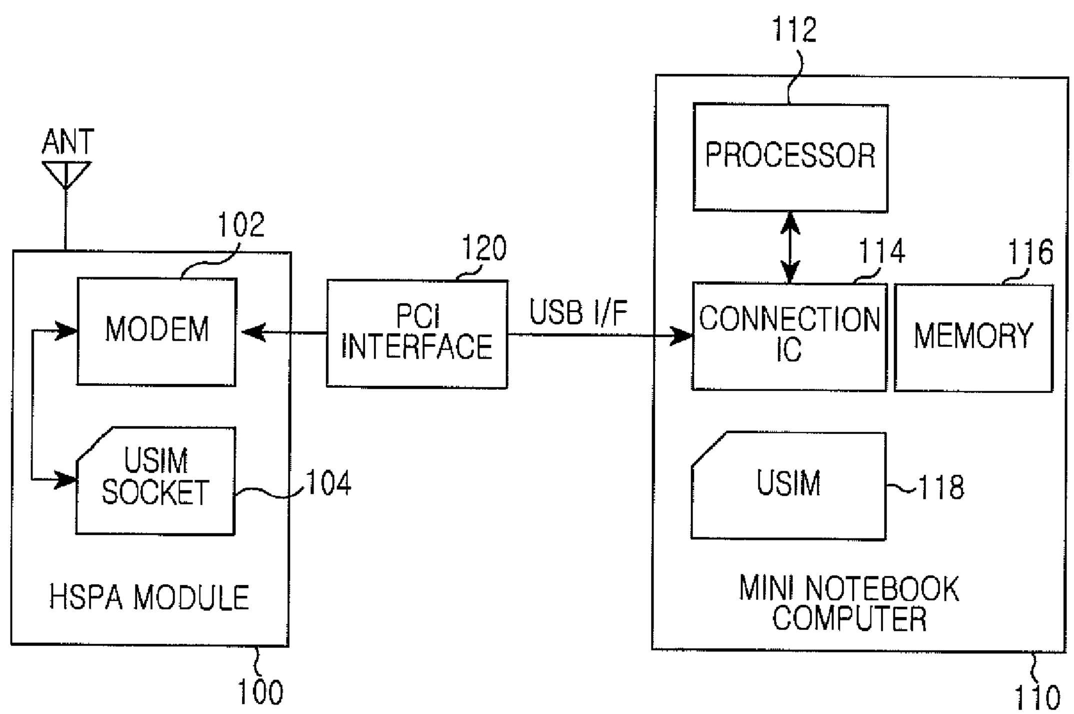
FIG. 1 illustrates a block diagram of a mini notebook computer according to an embodiment of the present invention.

FIG. 1 illustrates a block diagram of a mini notebook computer according to an embodiment of the present invention.

Referring to FIG. 1, a mini notebook computer 110 includes a processor 112, a connection IC 114, a universal subscriber identity module (USIM) 118, and a memory 116. An HSPA module 100 including a modem 102 is mounted on the mini notebook computer 110 to process high-speed data.

The processor 112 controls an overall operation of the mini notebook computer 110. The processor 112 controls a series of processes of receiving data from various input devices, processing the received data, and transmitting the processing results to an output device. According to the present invention, the processor 112 performs a power-on self test (POST) to control a booting operation. For example, the processor 112 processes the booting operation normally if necessary hardware devices (e.g., the memory 116, the HSPA module 100, and the USIM 118) are all detected in the POST operation and operate in a proper manner. However, if the necessary hardware device is not detected or operates in an improper manner, the processor 112 displays an error message on a display screen (not illustrated) and generates an alarm sound. Thereafter, the processor 112 terminates the booting operation forcibly and interrupts power supply to the mini notebook computer 110. To this end, the processor 112 transmits an attention (AT) command to the HSPA module 100 and the USIM 118 and determines whether the HSPA module 100 and the USIM 118 respond normally.

The memory 116 stores a program for controlling an overall operation of the mini notebook computer 110, and stores temporary data that are generated during the operation of the mini notebook computer 110.

The USIM 118 is a card-type module used in the mini notebook computer 110. The USIM 118 stores personal information in order to provide a subscriber with various services such as user authentication, charging, and security. Also, the USIM 118 may serve as a universal IC card that may provide a traffic card function or a credit card function. The universal IC card secures the security and integrity of personal information data by supporting the security of multiple applications. According to embodiments, the USIM 118 may be mounted on a USIM socket 104 in the HSPA module 100.

Under the control of the processor 112, the connection IC 114 transmits input data from a PCI interface 120 to the processor 112, the memory 116, or the USIM 118. Also, the connection IC 114 transmits a control signal or a data signal from the processor 112, the memory 116, or the USIM 118 to the HSPA module 100 through the PCI interface 120.

The modem 102 processes TX/RX signals through the antenna. For example, in a TX mode, the modem 102 channel-encodes and spreads TX data according to a predetermined radio access standard (e.g., HSPA) prior to transmission. In an RX mode, the modem 102 despreads and channel-decodes a received signal. The USIM socket 104 or the USIM slot 104 serves as a contact point for mounting a USIM card in the HSPA module 100.

The HSPA module 100 and the mini notebook computer 110 are connected through the PCI interface 120 and communicate signals in a USB signal format.

FIG. 1 illustrates that the USIM 118 is mounted in the mini notebook computer in separation from the HSPA module 100. However, according to embodiments, the USIM may be mounted in the HSPA module in a mobile device such as an e-book, as illustrated in FIG. 2.

Figure 2:
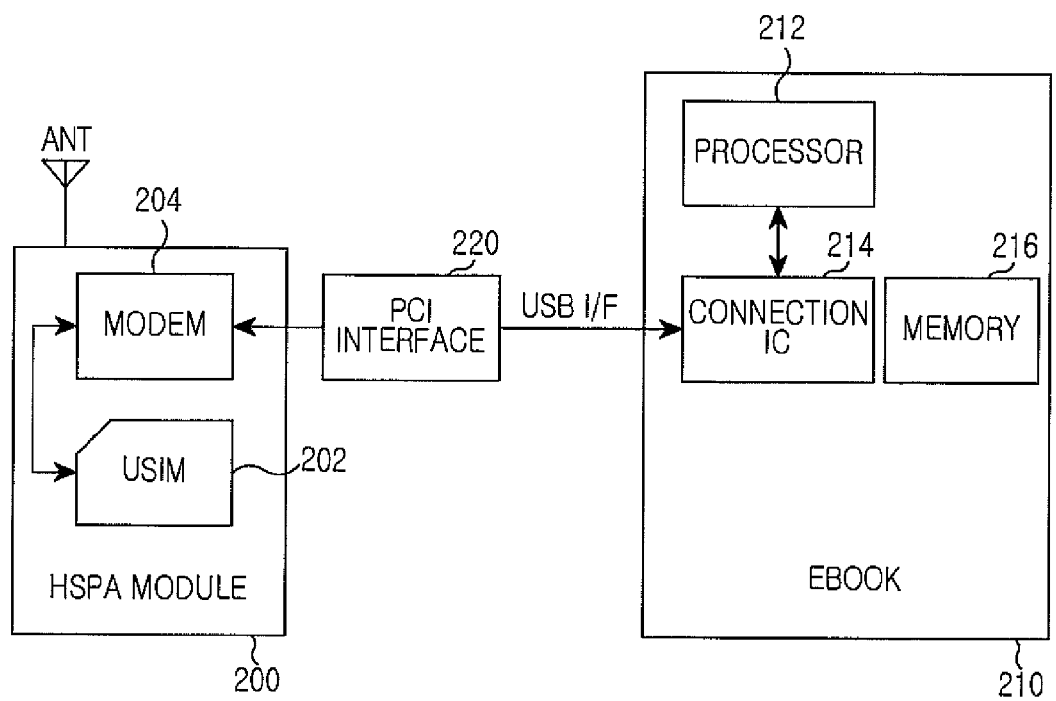
FIG. 2 illustrates a block diagram of an e-book according to an embodiment of the present invention.

FIG. 2 illustrates a block diagram of an e-book according to an embodiment of the present invention.

Referring to FIG. 2, an e-book 210 includes a processor 212, a connection IC 214, and a memory 216. An HSPA module 200 including a modem 204 and a USIM 202 is mounted on the e-book 210 to process high-speed data.

The functional blocks are identical to those of FIG. 1, and thus a detailed description thereof will be omitted for conciseness.

In FIG. 1, the processor 112 transmits an AT command to both the USIM 118 and the HSPA module 100 in a POST operation. However, in FIG. 2, the processor 212 transmits an AT command to only the HSPA module 200 because the USIM 202 is included in the HSPA module 200.

Figure 3:
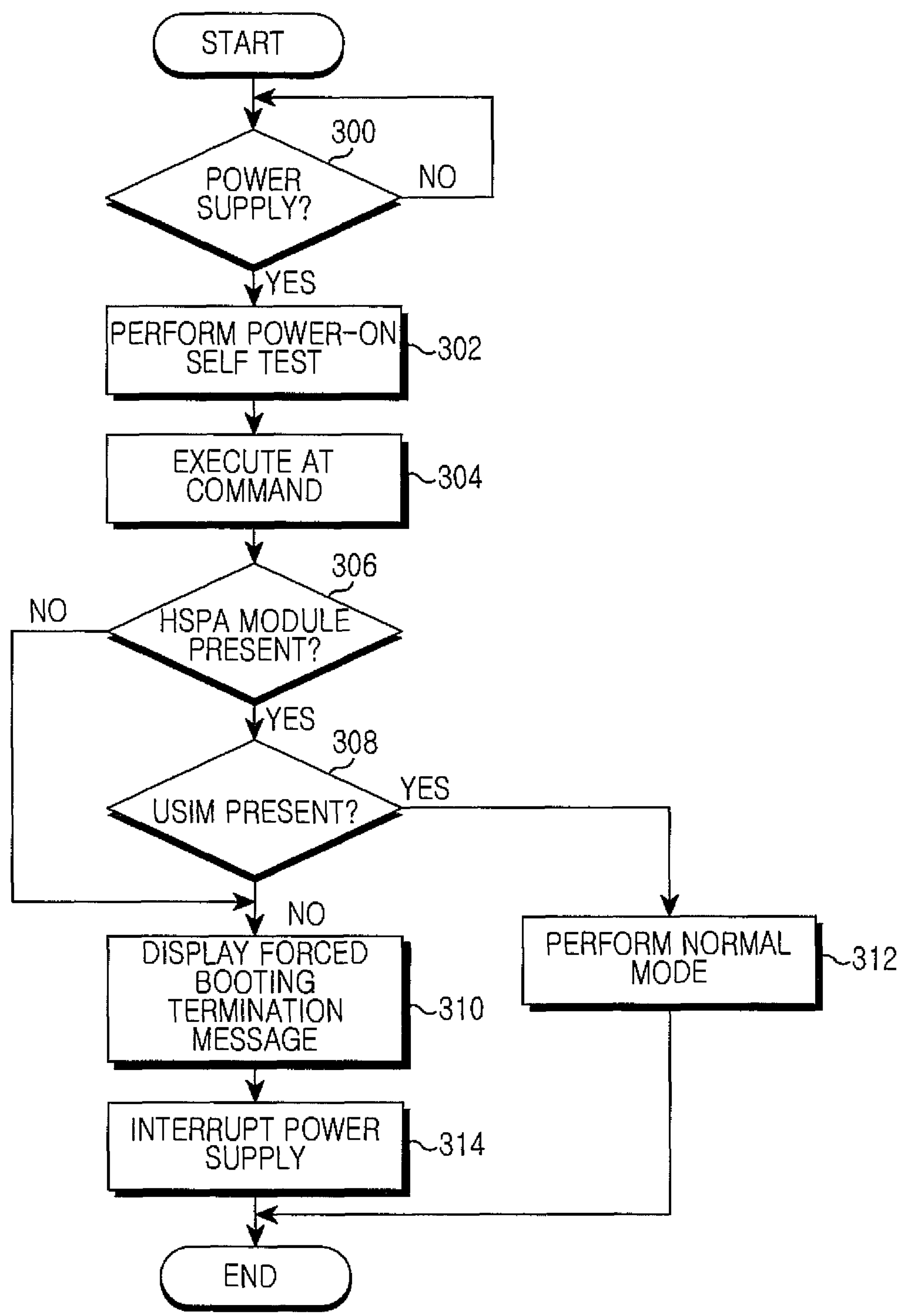
FIG. 3 illustrates a process for booting a mobile device according to an embodiment of the present invention.

FIG. 3 illustrates a process for booting a mobile device (e.g., a mini notebook computer) according to an embodiment of the present invention.

Referring to FIG. 3, when power is supplied to the mini notebook computer in block 300, a POST operation is performed in block 302 to determine whether the hardware units in the mini notebook computer operate normally.

In block 304, the mini notebook computer transmits an AT command to the HSPA module and the USIM. In block 306, the mini notebook computer determines whether the HSPA module is mounted thereon by determining whether a normal response is received from the HSPA module in response to the AT command.

If it is determined in block 306 that the HSPA module is mounted, the mini notebook computer proceeds to block 308. In block 308, the mini notebook computer determines whether the USIM is mounted by determining whether a normal response is received in response to the AT command. In contrast, if it is determined in block 306 that the HSPA module is not mounted, the mini notebook computer proceeds to block 310.

If it is determined in block 308 that the USIM is not mounted, the mini notebook computer proceeds to block 310. In block 310, the mini notebook computer displays a forced booting termination message on a display screen. In block 314, after a predetermined time, the power supply to the mini notebook computer is interrupted to terminate the booting operation.

In contrast, if it is determined in block 308 that the USIM is mounted, the mini notebook computer proceeds to a normal mode.

Figure 4:
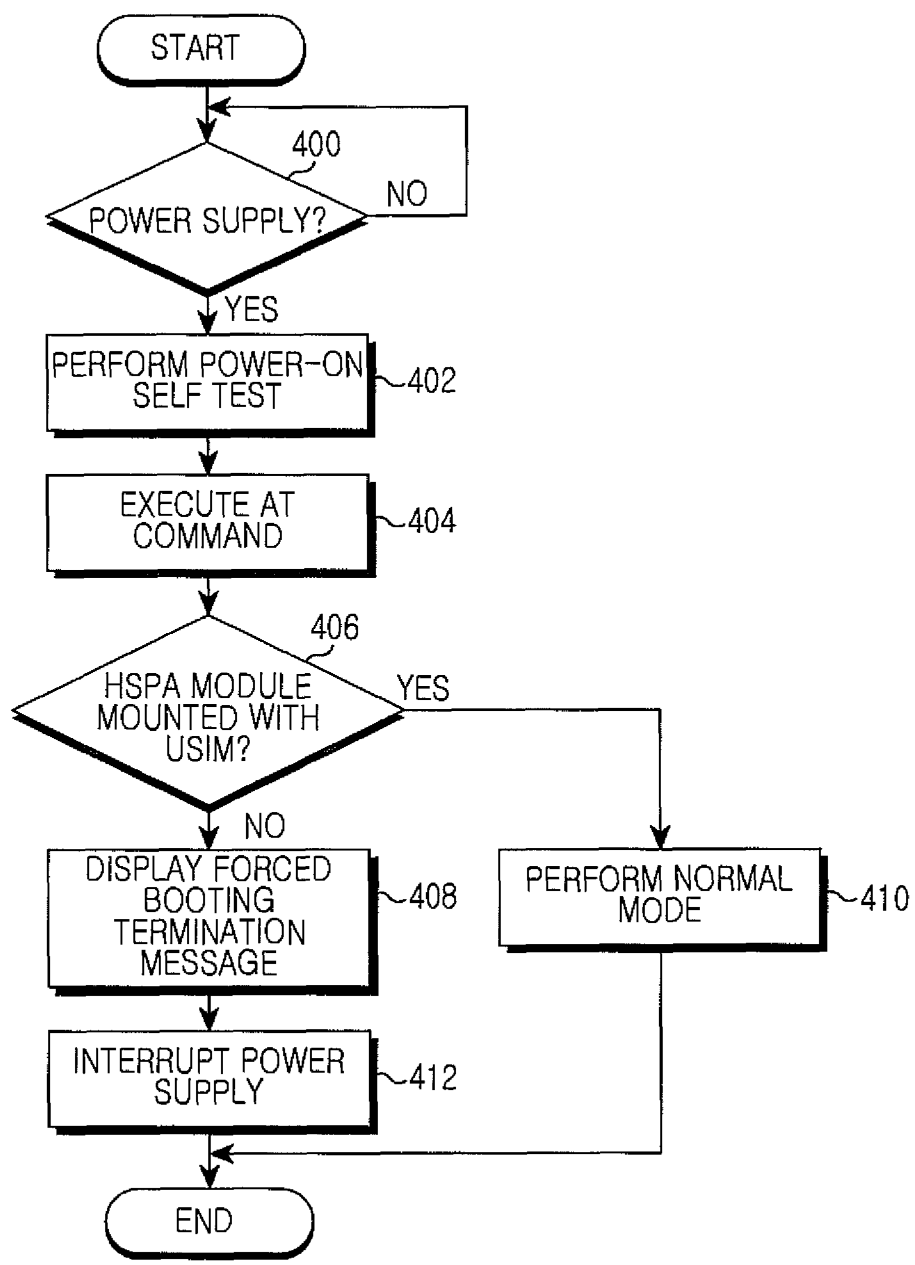
FIG. 4 illustrates a process for booting a mobile device according to an embodiment of the present invention.

FIG. 4 illustrates a process for booting a mobile device (e.g., a mini notebook computer) according to an embodiment of the present invention.

Referring to FIG. 4, when power is supplied to the mini notebook computer in block 400, a POST operation is performed in block 402 to determine whether the hardware units in the mini notebook computer operate normally.

In block 404, the mini notebook computer transmits an AT command to the HSPA module and the USIM. In block 406, the mini notebook computer determines whether the USIM is mounted in the HSPA module, by determining whether a normal response is received from the HSPA module in response to the AT command.

If it is determined in block 406 that the USIM is mounted in the HSPA module, the mini notebook computer proceeds to block 410 to a normal mode. In the normal mode, the user can use the applications in the mobile device.

In contrast, if it is determined in block 406 that the USIM is not mounted in the HSPA module, the mini notebook computer proceeds to block 408. In block 408, the mini notebook computer displays a forced booting termination message on a display screen. In block 412, after a predetermined time, the power supply to the mini notebook computer is interrupted to terminate the booting operation.

As described above, when power is supplied to the mobile device (e.g., the mini notebook computer or the e-book) mounted with the HSPA module, the HSPA module is checked during the POST operation. The AT command is used to check whether the HSPA module is mounted in the mobile device and whether the USIM is mounted normally. If there is no problem, the booting operation is completed and the corresponding operating program completes the normal boot process. If there is no HSPA module or USIM, the booting operation is terminated. That is, because the HSPA module is not mounted, the forced booting termination message is displayed on the display screen of the mobile device. Thereafter, the power supply to the mobile device is interrupted after a predetermined time.

As described above, the present invention performs a booting operation by determining whether an HSPA module or a USIM is mounted in a mini notebook computer or a net book computer, thereby making it possible to prevent the service user from using the mini notebook computer or the net book computer for other purposes and to prevent the service user from subscribing to an HSPA service of other communication service provider.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for controlling booting in a mobile device with a built-in communication module, the method comprising:

determining, during a booting operation, whether the communication module is mounted with a universal subscriber identity module (USIM);

terminating the booting operation in response to determining the communication module is not mounted with the USIM;

displaying a forced booting termination message;

determining whether a display time of the forced booting termination message is greater than a predetermined time; and interrupting a power supply to the mobile device, for restricting a use of the mobile device, in response to determining the display time of the forced booting termination message is greater than the predetermined time.

2. The method of claim 1, further comprising:

completing the booting operation and driving the corresponding operating program normally, in response to determining that the communication module is mounted with the USIM.

3. The method of claim 1, wherein the communication module is a high speed packet access (HSPA) module.

4. The method of claim 1, wherein determining whether the communication module is mounted with the USIM comprises:

transmitting an attention (AT) command from a processor to the communication module; and transmitting a response from the communication module to the processor in response to the AT command.

5. The method of claim 1, wherein determining whether the communication module is mounted with the USIM is performed during a Power-On Self Test.

6. A method for controlling booting in a mobile device, the method comprising:

determining, during a booting operation, whether the mobile device is mounted with a communication module and a universal subscriber identity module (USIM);

terminating the booting operation in response to determining the mobile device is not mounted with the communication module and the USIM;

displaying a forced booting termination message;

determining whether a display time of the forced booting termination message is greater than a predetermined time; and interrupting a power supply to the mobile device, for restricting a use of the mobile device, in response to determining the display time of the forced booting termination message is greater than the predetermined time.

7. The method of claim 6, further comprising:

completing the booting operation and driving the corresponding operating program normally, in response to determining that the mobile device is mounted with the communication module and the USIM.

8. The method of claim 7, wherein the communication module is a high speed packet access (HSPA) module.

9. The method of claim 7, wherein determining whether the mobile device is mounted with a communication module and the USIM comprises:

transmitting an attention (AT) command from a processor to the communication module and the USIM; and transmitting a response from the communication module and the USIM to the processor in response to the AT command.

10. The method of claim 6, wherein determining whether the mobile device is mounted with the communication module and the USIM is performed during a Power-On Self Test.

11. An apparatus for controlling booting in a mobile device with a built-in communication module, the apparatus comprising:

a processor configured to:

determine, during a booting operation, whether the communication module is mounted with a universal subscriber identity module (USIM), terminate the booting operation in response to determining the communication module is not mounted with the USIM, display a forced booting termination message, determine whether a display time of the forced booting termination message is greater than a predetermined time, and interrupt a power supply to the mobile device, for restricting a use of the mobile device, in response to determining the display time of the forced booting termination message is greater than the predetermined time.

12. The apparatus of claim 11, wherein in response to determining that the communication module is mounted with the USIM, the processor is configured to complete the booting operation and drive the corresponding operating program normally.

13. The apparatus of claim 11, wherein the communication module is a high speed packet access (HSPA) module.

14. The apparatus of claim 11, wherein the processor is configured to transmit an AT command to the communication module and receive a response from the communication module in response to the attention (AT) command, and configured to determine whether the communication module is mounted with the USIM.

15. The apparatus of claim 11, wherein the processor is configured to determine whether the communication module is mounted with the USIM during a Power-On Self Test.

16. An apparatus for controlling booting in a mobile device, the apparatus comprising:

a processor configured to:

determine, during a booting operation, whether the mobile device is mounted with a communication module and a universal subscriber identity module (USIM), terminate the booting operation in response to determining the mobile device is not mounted with the communication module and the USIM, display a forced booting termination message, determine whether a display time of the forced booting termination message is greater than a predetermined time, and interrupt a power supply to the mobile device, for restricting a use of the mobile device, in response to determining the display time of the forced booting termination message is greater than the predetermined time.

17. The apparatus of claim 16, wherein in response to determining that the mobile device is mounted with the communication module and the USIM, the processor is configured to complete the booting operation and drive the corresponding operating program normally.

18. The apparatus of claim 16, wherein the communication module is a high speed packet access (HSPA) module.

19. The apparatus of claim 16, wherein the processor is configured to transmit an attention (AT) command to the communication module and the USIM and receive a response from the communication module and the USIM in response to the AT command, and configured to determine whether the mobile device is mounted with the communication module and the USIM.

20. The apparatus of claim 16, wherein the processor is configured to determine whether the mobile device is mounted with the communication module and the USIM during a Power-On Self Test.

* * * * *